United States Patent Office 3,118,551
Patented Jan. 21, 1964

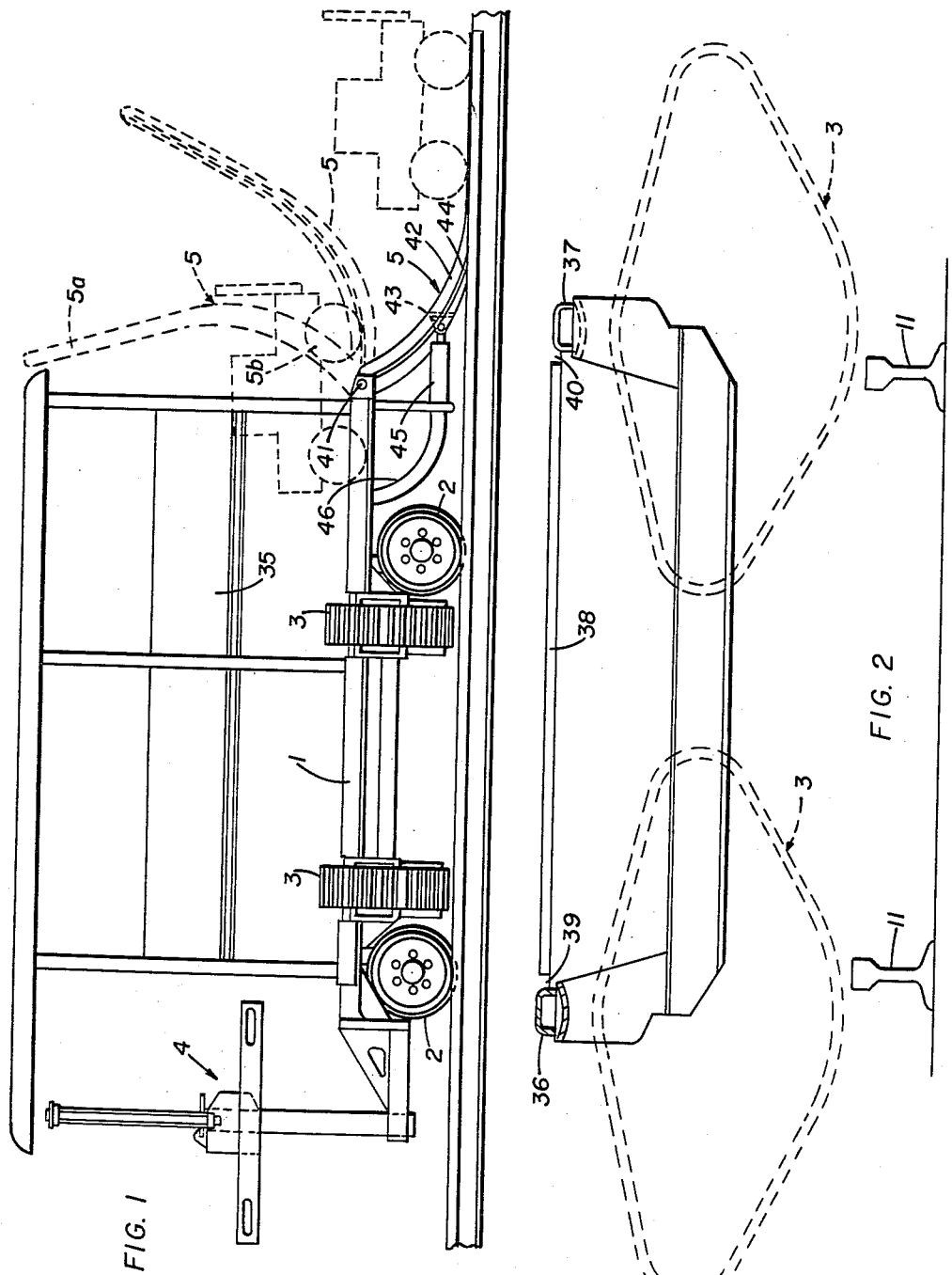

3,118,551
UTILITY CAR
John Kenneth Stewart, 60 Ballantyne Terrace,
Dorval, Quebec, Canada
Original application Mar. 12, 1959, Ser. No. 798,894, now Patent No. 3,035,529, dated May 22, 1962. Divided and this application June 30, 1961, Ser. No. 121,078
1 Claim. (Cl. 214—77)

This invention relates to railway vehicles, primarily, to railway maintenance vehicles of the type used for carrying a repair or maintenance gang and equipment. The present application is a division of application Serial No. 798,894 filed March 12, 1959, now Patent No. 3,035,529 issued May 22, 1962.

It is an object of the present invention to provide a railway maintenance vehicle with means for loading repair or maintenance equipment thereon. It will be understood that the mobility of maintenance equipment is a very important factor in todays railroads. While track must be maintained it must also be adequately available for the passage of regular traffic, thus, by providing means for the speedy removal of track maintenance units, applicant has ensured a very high degree of track maintenance working time with a very high percentage of track availability to regular traffic.

In accordance with the present invention there is provided in a railway maintenance vehicle of the type used for carrying a repair or maintenance gang and equipment, two main chassis beams extending longitudinally of the floor of the vehicle and channels in the floor extending along the inner edges of the said beams, said beams and channels being adapted to receive the flanged wheels of railway maintenance units loaded onto the vehicle for transport thereby, a loading ramp member being pivotally mounted at the rear of the vehicle and being vertically swingable under the control of piston-and-cylinder means, said loading ramp member including a pair of arms adapted, when lowered, to receive the flanges of the rail engaging wheels of one of said units from the rails of the railway track, said arms being curved whereby to load said units into the vehicle on upward swinging of said ramp member.

An embodiment of the invention will now be described, by way of example, with reference to the accompanying drawings, in which FIGURE 1 is a side elevation of a maintenance vehicle with endless tracks in raised position, a tamper head in raised position and the loading ramp member of the invention in lowered position in full lines and in raised position in dotted lines.

FIGURE 2 is a sectional end elevation showing the rails in the vehicle.

As shown in FIGURE 1 the vehicle comprises a body 1 having rail-engaging wheels 2, retractible endless tracks 3, tamper mounting mechanism 4 at the front end, and a rear loading ramp member 5.

The wheels 2, endless tracks 3, tamping mounting mechanism 4 and loading ramp member 5 are all adapted to be operated from a convenient source of power on the vehicle for example a hydraulic pumping mechanism driven by an internal combustion engine.

The vehicle illustrated in the drawings is adapted to transport a railway gang and maintenance or repair units from one working location to another. Such units may be wheeled tie removers, track aligners, etc., that are self-contained units provided with wheels for running on the track when the units are pushed. For the purpose of such transportation the body 1 of the vehicle is of box shaped construction to accommodate the equipment and is provided with seats 35 for the gang of workers, the seats 35 extending along the sides of the vehicle. To accommodate the flanged wheels of the wheeled maintenance units which are to be transported by the vehicle, the vehicle is provided with two main longitudinal chassis beams 36, 37 (FIGURE 2) which are spaced apart a distance equivalent to the gauge of the rails of the railway track and the floor 38 of the vehicle is interrupted to provide longitudinal channels 39 and 40 which extend along the inner edge of the beams 36 and 37 respectively. The wheels of the maintenance units thus ride or rest upon the beams 36 and 37 and the flanges of the wheels will be accommodated in the recesses 39 and 40. Loading ramp member 5 is provided at the rear of the vehicle to load the maintenance units from the railway track onto the beams 36 and 37. The loading ramp member 5 comprises a rectangular framework pivotally mounted at the rear of the vehicle on a pivot 41 and consisting of two spaced arms 42 interconnected at spaced intervals by bracing members of which one is shown at 43. The arms 42 are of T section with outwardly directed webs 44 adapted, when the frame is in the lowered position shown in FIGURE 1, to underlie the flanges of the wheels of a railway maintenance unit resting on the rails 11. The loading ramp member 5 is vertically swingable under the action of the hydraulic piston-and-cylinder arrangement 45 pivotally mounted at one end on a bracket 46 secured to the vehicle and pivotally mounted at the other end on a bracket secured to bracing member 43. Thus, when it is desired to load a railway maintenance unit into the vehicle, hydraulic fluid is exhausted from the piston-and-cylinder arrangement 45 so that the loading member 5 will swing downwards under the action of gravity from the upright transport position, in which it acts as a tail gate, until it reaches the position shown in full lines in FIGURE 1. The wheeled railway maintenance unit is then rolled manually along the rails 11 until the flanges of the wheels rest on the webs 44, whereupon hydraulic fluid is reintroduced into the piston-and-cylinder arrangement 45 to effect upward swinging of the loading ramp member 5 with the maintenance unit thereon. As the loading member 5 swings upwards the railway maintenance unit rolls along the webs 44 on its wheel flanges under the action of gravity until such flanges are introduced into the recesses 39, 40 which are in line with the webs 44. Special attention must be given to the shape of the loading ramp member 5. It has an outer straight section 5a and an inner section 5b in the form of a smooth transition curve. When loading a unit onto the vehicle the unit is maintained throughout the operation substantially in its upright operating position.

What I claim as my invention is:

In a railway maintenance vehicle of the type used for carrying wheeled railway maintenance units, a longitudinally extending track mounted on the vehicle and adapted to receive the flanged wheels of said units when loaded on to the vehicles for transportation thereby, a ramp member pivotally mounted at one end of the vehicle and vertically swingable thereon, piston and cylinder means for swinging the ramp about its pivot between a raised tail-gate like transportation position and a lowered track engaging loading position, said ramp including a pair of transversely spaced apart wheel receiving arm members of T section with webs adapted to receive, when the ramp is lowered into engagement with a railway track, the flanges of the wheels of one of said units from the rails of the railway tracks, the arms having an outer straight and an inner curved section, the transition between straight and curved sections being smooth, and when the ramp is swung upwardly to roll said unit along the webs of the arms on its flanged wheels under the action of gravity until such flanges are introduced to the longitudinal track, said unit being maintained throughout the loading operation substantially in its upright operating position.

References Cited in the file of this patent

UNITED STATES PATENTS

| | | |
|---|---|---|
| 658,525 | Huse | Sept. 25, 1900 |
| 2,789,707 | Wolf | Apr. 23, 1957 |
| 2,792,134 | Kinnee | May 14, 1957 |
| 2,956,698 | Wills | Oct. 18, 1960 |

FOREIGN PATENTS

| | | |
|---|---|---|
| 187,187 | Great Britain | Oct. 19, 1922 |
| 656,795 | France | Jan. 5, 1929 |
| 1,097,134 | France | Feb. 7, 1955 |